United States Patent [19]

Creighton

[11] Patent Number: 4,600,745

[45] Date of Patent: Jul. 15, 1986

[54] ADHESIVE COMPOSITIONS

[75] Inventor: Edward Creighton, Stafford, England

[73] Assignee: Evode Limited, Stafford, England

[21] Appl. No.: 752,014

[22] Filed: Jul. 8, 1985

Related U.S. Application Data

[63] Continuation of Ser. No. 503,565, Jun. 13, 1983, abandoned.

[30] Foreign Application Priority Data

Jun. 17, 1982 [GB] United Kingdom ............... 8217501

[51] Int. Cl.$^4$ .................... C08L 9/00; C08K 3/20; C08K 3/26; C08J 3/24
[52] U.S. Cl. ....................... 524/534; 524/425; 524/433; 524/788; 524/856; 525/236; 528/389
[58] Field of Search ............... 524/534, 425, 433, 788, 524/856; 525/236; 528/389

[56] References Cited

U.S. PATENT DOCUMENTS

| | | | |
|---|---|---|---|
| 2,468,159 | 4/1949 | Barton | 524/856 |
| 3,400,091 | 9/1968 | Stumpe, Jr. | |
| 3,689,450 | 9/1972 | Warner | 524/297 |
| 3,770,688 | 11/1973 | Hamann et al. | 524/611 |
| 3,897,260 | 7/1975 | Yaginuma et al. | 524/856 |
| 3,919,133 | 11/1975 | Dawans et al. | 525/236 |
| 3,920,769 | 11/1975 | Yaginuma et al. | 525/236 |
| 4,064,922 | 12/1977 | Farber | 428/512 |
| 4,101,478 | 7/1978 | Mitrofanovich et al. | 524/255 |
| 4,222,906 | 9/1980 | Brigg et al. | 525/236 |

FOREIGN PATENT DOCUMENTS

| | | |
|---|---|---|
| 931722 | 8/1955 | Fed. Rep. of Germany . |
| 1395960 | 5/1965 | France . |
| 1343588 | 1/1974 | United Kingdom . |

*Primary Examiner*—Herbert J. Lilling
*Attorney, Agent, or Firm*—Watson, Cole, Grindle & Watson

[57] ABSTRACT

An adhesive composition for filling gaps and sealing joints in engineering assembly comprises a blend of 100 parts by weight of a liquid polybutadiene polymer having an average molecular weight from 1,000 and a viscosity from 2 to 800 dPas at 25° C., at least 40 percent of the unsaturation having a 1,4 configuration, preferably cis 1,4; 5 to 60 parts of powdered sulphur; 2.5 to 70 parts of an organic accelerator or accelerators; and up to 80 percent by weight of an inert filler or fillers. The adhesive composition may also include promoters, dessicants, blowing agents and/or solid rubber, preferably solid polybutadiene.

9 Claims, No Drawings

ADHESIVE COMPOSITIONS

This application is a continuation of application Ser. No. 503,565, filed June 13, 1983, now abandoned.

BACKGROUND TO THE INVENTION

Heat-curable adhesive compositions are commonly used in engineering manufactures for adhesive, gap-filling and sealing purposes in the joining of components. For example, in the manufacture of a vehicle body, joints between component parts may be secured, filled or sealed with such compositions which are then cured to develop the full strength and durability of the joints and seals by passing the assembled body through a stoving oven.

Compositions commonly used for such purposes are polyvinyl chloride plastisols, acrylate plastisols, various solvent-based adhesives, polyurethanes and epoxy adhesives. These compositions have certain disadvantages, as follows.

POLYVINYL CHLORIDE PLASTISOLS

The polyvinyl chloride polymer contains residual vinyl chloride monomer which is a health hazard. In addition, polyvinyl chloride and other chlorinated ingredients, such as secondary plasticizers, are liable to split off corrosive hydrogen chloride when they degrade. This degradation may be accelerated by the action of heat or light. Whilst it may be retarded by the addition of stabilizers, it cannot be eliminated, and is particularly serious when relatively high stoving temperatures are used or when joints are spot welded after application of the adhesive or sealing composition. Spot welded joints cause other problems due to the presence in the compositions of plasticizers that are volatile at welding temperatures, since the vapour generated by the welding heat tends to displace the composition from the joints in the vicinity of the welds. The tracks formed by the escaping vapour act as pathways through which water may later enter the joints. The presence of moisture and corrosive hydrogen chloride around the stressed metal of a weld presents a serious corrosion problem.

ACRYLATE PLASTISOLS

These also contain volatile plasticizers and give rise to the problems of displacement of compositions from the joints when spot welding is necessary, providing tracks which can admit moisture and cause corrosion.

SOLVENT-BASED ADHESIVES

The volatile and often flammable solvents present in these compositions can present health hazards. Even after long drying times, residual solvents often remain and can cause blistering or bubbling during stoving or welding, with the aforementioned displacement of composition from the joints in the latter case. When the solvents are flammable, welding of joints containing the compositions may not be permissible due to the risk of fire.

POLYURETHANES AND EPOXY ADHESIVES

These materials are generally expensive and may lead to health hazards due to the presence of isocyanates, epoxy resins and amine hardeners.

The present invention concerns new heat-curable adhesive compositions which can be used for the purposes mentioned above in a similar manner to the compositions commonly used for such purposes, but which do not suffer from the disadvantages mentioned.

SUMMARY OF THE INVENTION

According to this invention, an adhesive composition comprises a blend of 100 parts by weight of a liquid polybutadiene polymer specimen having average molecular weight in the range 1,000 to 10,000 and viscosity in the range 2 to 800 dPas at 25° C., wherein at least 40 percent of the unsaturation has a 1,4 configuration, together with 5 to 60 parts by weight of powdered sulphur, 2.5 to 70 parts by weight of an organic accelerator or blend of accelerators, and up to 80 percent by weight of an inert filler or fillers.

The liquid polybutadiene polymer specimen preferably has at least 70 percent of the unsaturation in the cis 1,4 configuration and less than 5 percent in the vinyl 1,2 configuration.

Adhesive compositions within the ranges specified are pastes with viscosities at normal room temperatures comparable with those of the known compositions mentioned above which are commonly used for the purposes described, and they can be handled and applied by similar equipment. Like those known compositions, they may be cured by heating, for example in a stoving oven. When cured, suitably formulated compositions show good adhesion to degreased steel, mild steel coated with mill oil and mild steel coated with anodic or cathodic electrophoretic primers. Compositions within the ranges specified are unusual in that, whereas vulcanization of rubbers is usually conducted under pressure to prevent the formation of voids or unwanted foamed or porous products, they can be cured at atmospheric pressure to give satisfactory products.

PRIOR ART

U.S. Pat No. 3,400,091 discloses caulking compositions of putty-like consistency made with minor proportions (generally 10 to 22 percent) of solid cis 1,4 polybutadiene blended with mineral oils and fillers, together with sulphur or other conventional vulcanising agents and accelerators. Vulcanization at normal temperatures is envisaged. The possibility of including sodium-catalyzed liquid polybutadiene as a plasticizer is mentioned, but that material is suggested only as one of several examples of plasticizers which may be used.

Adhesive properties of liquid polybutadiene have been disclosed in broad terms in German Patent Specification No. 931,722, but the polymers there mentioned, being produced by sodium catalysis, are outside the scope of the present invention. Sodium catalysis produces solely or mainly the vinyl 1,2 configuration which we have found to be unsuitable for heat-curable compositions for the purposes with which the present invention is concerned.

Liquid polybutadiene polymers are, of course, known to be curable by heat when blended with sulphur and suitable accelerators. See, for example, French Patent Specification No. 1,395,960, which discloses the production of higher molecular weight polymers by vulcanization of liquid aliphatic diolefin polymers, such as polybutadiene, in order to obtain elastic polymers suitable for uses other than paints, varnishes and the like, to which the liquid polymers are said to have been limited. Liquid polybutadiene polymers can be prepared having varying proportions of components with different unsaturation configurations, viz.: vinyl 1,2; trans 1,4; cis 1,4 and cyclicises components, and different molecular weights. The proportions of these components in a particular liquid polybutadiene polymer specimen depend upon its method of production, as explained in the Paper "Liquid Butadiene Telomers" presented at the Liquid Polymers Symposium, University of Surrey, Sept. 14–27th, 1972 by Dr. C. Bondy and A. C. Purkis. Due to the variable proportions and average molecular weights of the components, liquid polybutadiene polymers have wide ranges of viscosities and other properties. These have enabled their use in paints, varnishes and the like, as disclosed in the above-mentioned French Specification and in British Patent Specification No. 1,343,588. Likewise, when cured, the polymers display wide ranges of properties, including ranges of hardness and rigidity which are of special interest in the context of the present invention. Liquid polybutadiene polymers with high proportions of 1,2 and/or cyclicized components (that is, those having less than 40 percent of their unsaturation in the 1,4 configuration) are more sensitive to cure temperature. For example, a satisfactory cure may not be obtained at 160° C., but at 200° C. a hard, brittle solid may be produced, with only a narrow band of temperatures at which reasonable flexibility and adhesion are obtained. Products mentioned in the noted German Specification No. 931,722 have been found to suffer from these difficulties and would not be suitable for use under normal production factory conditions.

DETAILED DESCRIPTION

Conversely, polymers having more than 40 percent of their unsaturation in the 1,4 configuration result in products that are very tolerant of cure temperature. They can be made to have good flexibility and adhesion to a variety of surfaces, including oiled steel, when cured at temperatures as low as 140° C. or up to at least 250° C. With optimum content of sulphur and accelerators, they are capable of withstanding higher temperatures, such as may be required in stoving ovens for other purposes, up to about 300° C.

In general, higher molecular weight polymers give properties with a better combination of strength and flexibility, whilst low viscosity polymers accept higher filler loadings and give compositions which may more easily be pumped. Particularly interesting are the range of liquid polybutadiene polymers having high proportions (i.e., 70 to 90 percent) of the cis 1,4 double bond configuration, with the balance (i.e. up to 30 percent) being in the trans 1,4 double bond configuration. These mixtures combine relatively high molecular weights with relatively low viscosities (e.g., 7.5 dPas with molecular weights about 1,500, 30 dPas with molecular weights around 3,000, and 300 dPas with molecular weights about 6,000).

By appropriate selection of the polymer specimen, the proportions of sulphur and selection of accelerator or accelerators and filler or fillers, compositions may be designed by use of the invention to produce, when cured, specific properties required for a particular adhesive and/or sealant purpose. Compositions can be formulated to adhere well to aluminium or painted surfaces as well as having the aforementioned good adhesion to both degreased and oiled steel.

The properties of the cured compositions may be varied further by the addition of other ingredients, such as adhesion promoters, dessicants, blowing agents, antioxidants, thixotropic agents and a proportion of solid rubber, for example solid polybutadiene, to modify viscosity and other handling characteristics. When solid rubber is contained in the adhesive composition, it can constitute up to 20 parts by weight thereof. When the adhesive composition contains 20 parts by weight of solid rubber, it will constitute about 17 percent of the vulcanizable component of the adhesive composition, the liquid polybutadiene polymer specimen, being present to the extent of 100 parts by weight of the adhesive composition, constituting about 83 percent of the vulcanizable component.

The compositions according to the invention have longer shelf lives and better viscosity stability than polyvinyl chloride or acrylate plastisols or single-part epoxy adhesives.

The invention includes a method of joining, or sealing joints between, components, comprising the steps of forming a joint between portions of the components with a coating of an adhesive composition as described on at least a part of each of the joined portions and heating the coated joint to cure the adhesive composition.

The coating of the composition may, and preferably does, extend throughout the joined portions. In practice, one or both portions to be joined may be coated with the composition paste, applied for example by brush or pressure line, and the two portions are then pressed together to form the joint and heated to cure the composition. The joint may be secured together temporarily during heating, for example by a clamp which may be removed after the composition is cured, according to normal practice.

Since the adhesive compositions need not contain volatile or flammable solvents, plasticizers or chlorinated components, the aforementioned hazards experienced with known adhesive and sealant compositions can be eliminated. Joints made with the adhesive compositions described may be spot welded without giving rise to corrosive decomposition products, and the absence of volatile components reduces the risk of producing tracks through which moisture may later enter the joints. The adhesive compositions described have been found to produce satisfactory sealed joints under all normal conditions experienced in engineering assembly plants.

When spot welding of joints is not required, plasticizers or oils may be included in the adhesive compositions in order to reduce costs.

The invention is illustrated by the following examples, the proportions of the various components being given in each case in parts by weight.

EXAMPLE 1

Liquid Polybutadiene (80 to 95% 1,4; M.W. 3,000; 30 dPas): 100
Solid polybutadiene: 5.88
Calcium Carbonate: 155.88
Sulphur: 8.82
Benzothiazyl disulphide: 11.76
Calcium Oxide: 11.76

This is a flexible joint sealing composition with good adhesion to degreased mild steel, mild steel coated with mill oil and mild steel painted with either anodic or cathodic electrophoretic primers. It is cured by stoving for 30 minutes at 160° to 200° C.

EXAMPLES 2 TO 6

| Example Number | 2 | 3 | 4 | 5 | 6 |
|---|---|---|---|---|---|
| Liquid polybutadienes | | | | | |
| (80 to 95% 1,4) | | | | | |
| M.W. 1,500; 7 dPas | 100 | — | 100 | 65.85 | — |
| M.W. 3,000; 30 dPas | — | 100 | — | — | — |
| M.W. 6,200; 300 dPas | — | — | — | 34.15 | 100 |
| Solid polybutadiene | 10.00 | — | 11.11 | — | 7.19 |
| Calcium carbonate | 137.14 | — | 37.04 | 21.95 | 22.46 |
| Bentone | 8.57 | 78.38 | — | — | — |
| French chalk | — | 78.38 | — | — | — |
| Talc | — | — | 144.44 | 63.41 121.88 | — |
| Calcium oxide | 5.71 | 8.11 | 22.22 | 12.20 | 18.75 |
| Zinc oxide | 8.57 | — | 18.52 | — | 12.50 |
| Sulphur | 14.29 | 5.41 | 6.30 | 36.34 | 7.50 |
| Benzothiazyl disulphide | 4.11 | 2.70 | 46.30 | 11.22 | 16.25 |
| Diphenyl guanidine | — | 0.22 | — | — | — |
| 2.2'-methylene-bis-(4-methyl-6-tert-butylphenol) | 0.17 | 0.16 | 2.22 | 0.98 | — |

All these examples cured when stoved for 30 minutes at 160° to 210° C. Specific examples of their adhesion are given as follows:

Example 2, stoved for 35 minutes at 205° C., gave a shear strength of 1.3 MPa for a 3 mm. thick overlap joint between oiled mild steel test pieces.

In similar overlap joints, Example 4, stoved for 13 minutes at 165° C., gave a shear strength of 1.0 MPa; Example 5, stoved for 15 minutes at 175° C., gave a shear strength of 10 MPa; and Example 6, stoved for 35 minutes at 205° C., gave a shear strength of 1.4 MPa.

EXAMPLE 7

Liquid Polybutadiene (over 95% 1,4; M.W. 6,200; 300 dPas): 100
Calcium carbonate: 226.32
Calcium oxide: 68.42
Zinc oxide: 26.32
Naphthenic oil: 84.21
Sulphur: 26.32
Benzothiazyl disulphide: 2.63
Dibutylamine complex of zinc dibutyldi thiocarbomate: 0.53

This example is for a low-cost, oil-extended seam sealer which cures when stoved for a minimum of 15 minutes at 165° C. to give a soft, flexible product.

EXAMPLES 8 AND 9

| Example number | 8 | 9 |
|---|---|---|
| Liquid polybutadienes (80 to 95% 1,4) | | |
| M.W. 1,500; 7 dPas | 61.76 | 66.67 |
| M.W. 6,200; 300 dPas | 38.24 | 33.33 |
| Talc | 70.59 | 63.64 |
| Aromatic process oil | 64.71 | 60.61 |
| Calcium carbonate | 20.58 | 21.21 |
| Sulphur | 35.29 | 36.36 |
| Benzothiazyl disulphide | 11.76 | 12.12 |
| Shear strengths for a 0.3 mm. thick overlap joint between oiled mild steel test pieces when stoved for 15 minutes at 175° C. (MPa) | 2.17 | 7.24 |

EXAMPLE 10

Liquid polybutadienes (80 to 95% 1,4)
 M.W. 3,000: 30 dPas: 20
 M.W. 6,200; 300 dPas: 80
Calcium carbonate: 112.50
Calcium oxide: 5.00
Sulphur: 10.00
Benzothiazyl disulphide: 12.50
Phenolic resin: 2.50
Sulphonyl Hydrazide (blowing agent): 0.75
Azodicarbonamide (blowing agent): 0.75

This example is for a foamed adhesive sealant, especially suitable for irregular gaps. The volume expansion is in excess of 50 percent when the product is stoved for 30 minutes at 200° C.

I claim:

1. An adhesive composition which is in the form of a paste and which comprises a vulcanizable component, powdered sulfur, an accelerator system and a filler system, at least about 83 percent by weight of the vulcanizable component being a liquid polybutadiene polymer specimen having an average molecular weight in the range of 1,000 to 10,000, a viscosity in the range of 2 to 800 dPas at 25° C. and at least 40 percent of the unsaturation in the 1,4 configuration; said vulcanizable component constituting 100 parts by weight of the composition; said powdered sulfur constituting 5 to 60 parts by weight of the composition; said accelerator system constituting 2.5 to 70 parts by weight of the composition; and said filler system, which comprises at least one inert filler, constituting up to 80 percent by weight of the composition.

2. An adhesive composition as claimed in claim 1 wherein said 40 percent of the unsaturation is in the cis 1,4 configuration.

3. An adhesive composition as claimed in claim 1 wherein said liquid polybutadiene polymer specimen has at least 70 percent of the unsaturation in the cis 1,4 configuration.

4. An adhesive composition as claimed in claim 1 wherein said liquid polybutadiene polymer specimen has less than 5 percent of the unsaturation in the vinyl 1,2 configuration.

5. An adhesive composition as claimed in claim 1, wherein said vulcanizable component includes solid rubber.

6. An adhesive composition as claimed in claim 5, wherein said solid rubber constitutes about 17 percent by weight of said vulcanizable component.

7. An adhesive composition as claimed in claim 1, wherein said vulcanizable component consists of said liquid polybutadiene polymer specimen.

8. An adhesive composition as claimed in claim 5 wherein said solid rubber is solid polybutadiene.

9. An adhesive composition as claimed in claim 3, wherein said liquid polybutadiene polymer specimen has substantially all of the unsaturation in the cis 1,4 configuration.

* * * * *